June 10, 1930.    K. G. ÖSTBERG    1,763,563
VALVE GEAR, PARTICULARLY FOR INTERNAL COMBUSTION MOTORS
Filed Nov. 23, 1926    5 Sheets-Sheet 4

K. G. Östberg
INVENTOR

By: Marks & Clark
Attys.

June 10, 1930.  K. G. ÖSTBERG  1,763,563
VALVE GEAR, PARTICULARLY FOR INTERNAL COMBUSTION MOTORS
Filed Nov. 23, 1926   5 Sheets-Sheet 5

INVENTOR:
K. G. Östberg
BY Marks & Clerk
ATTORNEYS.

Patented June 10, 1930

1,763,563

UNITED STATES PATENT OFFICE

KARL GUSTAF ÖSTBERG, OF STOCKHOLM, SWEDEN

VALVE GEAR, PARTICULARLY FOR INTERNAL-COMBUSTION MOTORS

Application filed November 23, 1926, Serial No. 150,346, and in Sweden February 6, 1926.

The present invention refers to a valve device primarily intended for internal combustion motors of the four stroke cycle type, but adapted also for other purposes, and the object of the invention is to facilitate in outwardly opening valves an efficient self-tightening effect under the influence of internal excess pressures. To this end, an outwardly opening valve is provided, according to the invention, with a movable valve seat in the form of a piston valve or the like which is pressed by an internal excess pressure against the valve body, when the latter is retained in the closed position by means of the valve gear or a special locking mechanism and, in turn, affords a tight fit with the surroundings by means of piston rings or other piston tightening means.

A further development of the invention consists in that the movable valve seat is carried by or forms a part of an external valve surrounding the first mentioned valve annularly and co-axially, the said piston valve or the like thus forming at the same time a valve seat in the internal or central valve, and a valve body in the external valve. By this means a compact arrangement of two valves, which is particularly advantageous for internal combustion motors, may be obtained, without it being necessary to make the passage openings of the valves smaller than normal.

Such compact co-axial arrangement of two outwardly opening valves makes it possible in a four stroke cycle internal combustion motor to provide a spherical or approximately spherical combustion chamber, the wall of which is partly formed by the valve aggregate, which is for this purpose shaped on the inside as a spherical cap or the like. The spherical shape of the combustion chamber is known to be the ideal form, in which the combustion paths are the shortest, the surfaces surrounding the combustion chamber being reduced to a minimum with respect to the enclosed volume, whereby the losses of heat are appreciably reduced.

Figure 1:
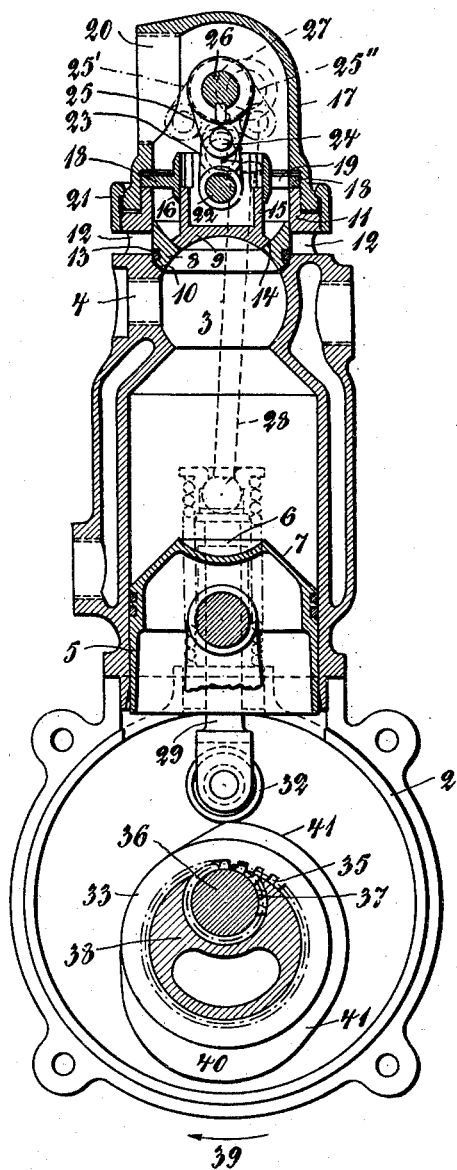
Figure 2:
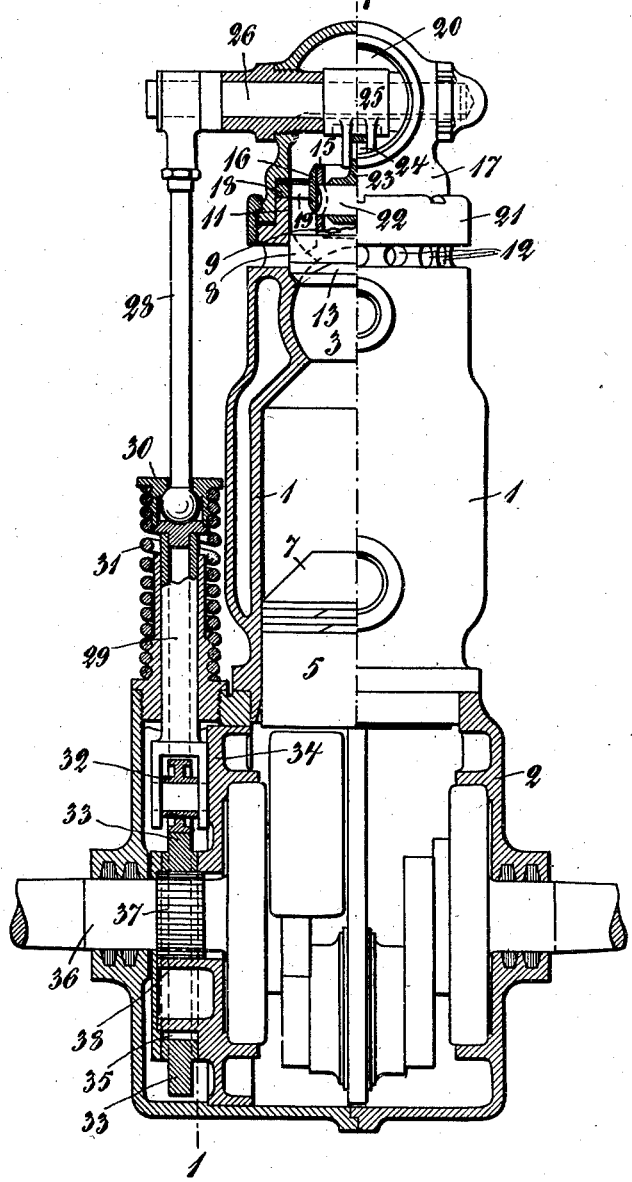
Figure 3:
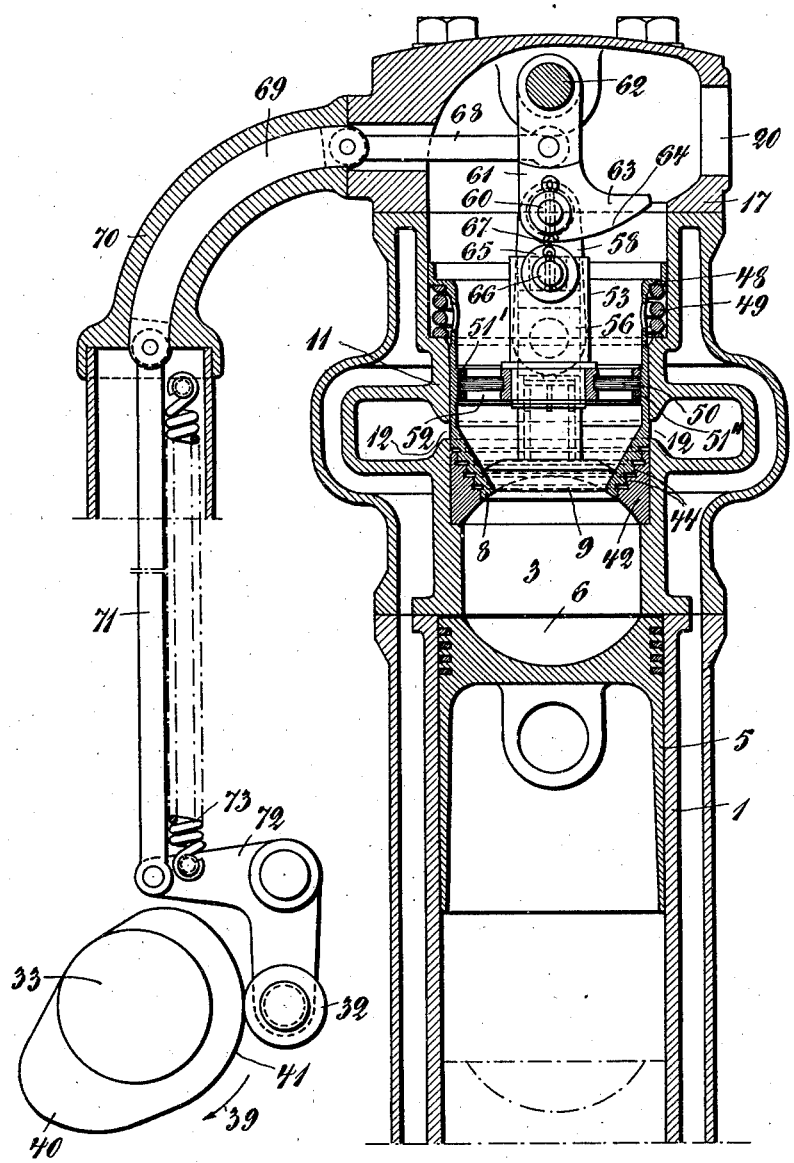
Figure 4:
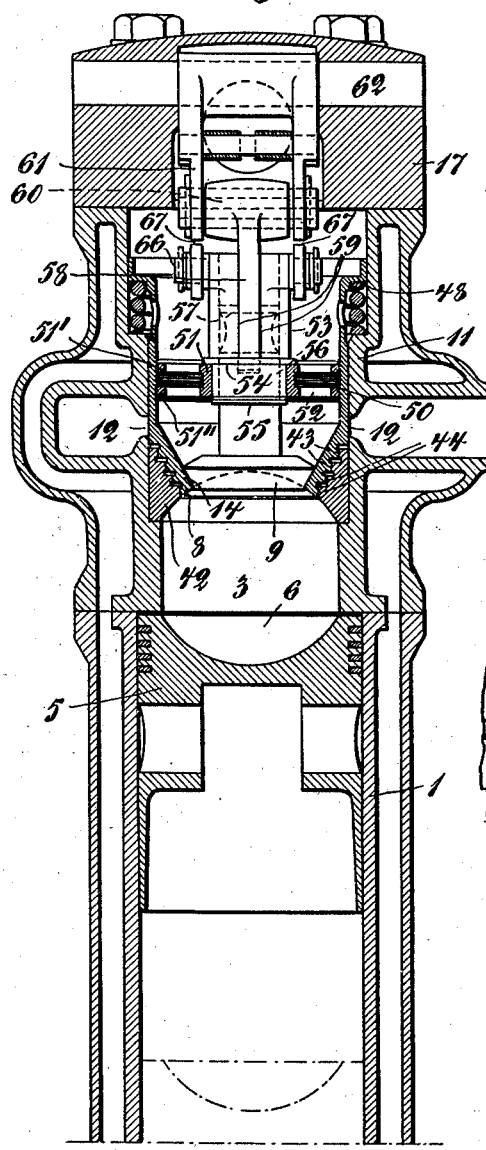
Figure 5:
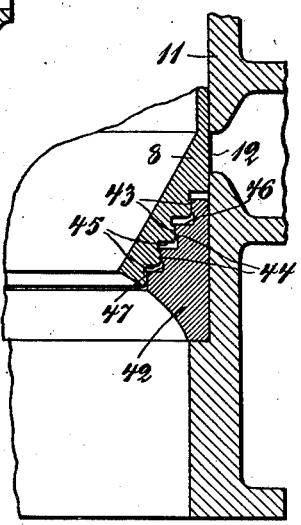
Figure 6:
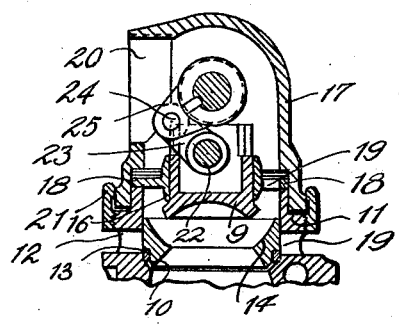
Figure 7:
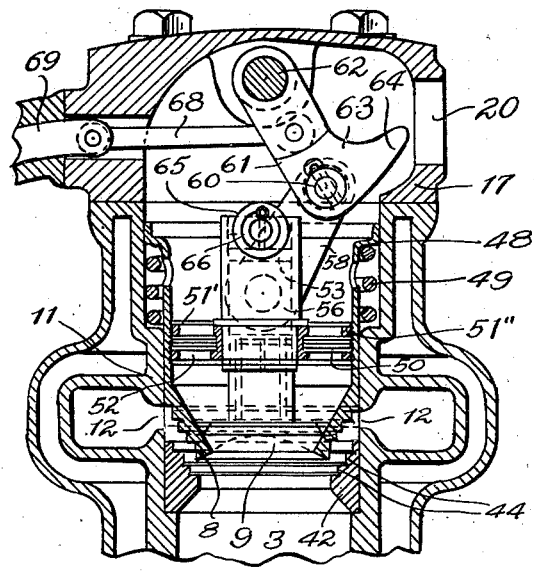

The invention will be described more fully with reference to the accompanying drawings which illustrate two embodiments of the invention as applied to a one-cylinder four stroke cycle motor. Fig. 1 is a section of a motor according to the first embodiment said section being taken at right angles to the crank shaft on line 1—1 in Fig. 2. Fig. 2 shows the same motor, partly in elevation, and partly in section at right angles to the section according to Fig. 1. Figs. 3 and 4 are sections of the motor according to the second embodiment taken at right angles to each other. Fig. 5 shows a detail of Figs. 3, 4 on an enlarged scale; Fig. 6 is a sectional detail partly in elevation illustrating the valve arrangement according to Figs. 1 and 2 in the inlet position, and Fig. 7 is a vertical sectional detail partly in section illustrating the valve arrangement according to Figs. 3 and 4 in exhaust position.

In the arrangement according to Figs. 1 and 2, the working cylinder 1, which is connected at the bottom to the crank casing 2, is tapering upwards and extends into a spherically shaped combustion chamber 3, the wall of which is provided at one side with a threaded hole 4 for the spark plug. The piston 5 of the working cylinder is provided on the upper side with a bulge in the form of a spherical cap 6 forming the bottom of the combustion chamber and completing the spherical shape thereof when the piston is in its innermost position. The circumferential portion of the upper part of the piston forms a frustrum 7 fitting accurately to the upper conical portion of the cylinder and filling the latter completely in the innermost position of the piston. The upper portion of the wall of the combustion chamber is formed by the valves 8, 9 arranged co-axially with respect to one another and also in relation to the working cylinder, the inner sides of said valves facing the combustion chamber forming together a spherical cap. The external, surrounding valve 8 consists of a piston valve povided at the bottom with a conically cut edge 10 bearing normally against a corresponding supporting surface turned into the wall of the combustion chamber. The piston valve is displaceable in a valve cylinder 11 forming an upper extension of the working cylinder and provided circumferentially with a number of exhaust openings 12 which are normally closed by the piston valve, the latter being also provided with a split piston ring 13 bearing with a tight fit against the inside of the valve cylinder. The inner circumference of the piston valve is formed into an upwardly diverging conical seat 14 for the centrally disposed valve 9. The latter is provided with an upper cylindrical extension 15, which is axially displaceable in an annular guide ring 16. The guide ring 16 is carried by a ring 18 inserted between the upper edge of the valve cylinder 11 and a cap 17 placed thereon, the ring 18 being provided with passage openings 19 for the fuel gases which during the suction period enter through an opening 20. The cap 17 is secured by means of an annular nut 21 threaded onto the cylinder 11.

Inserted transversely through the cylindrical extension 15 is a stud 22 forming the bearing for the lower end of a link 23, the upper end of which is mounted on the crank pin 24 of a crank 25 which is fast on a crank shaft 26 journalled in the cap 17. Attached to the outer end of the shaft 26 is a crank 27 connected with the upper end of a link rod 28, the lower spherically enlarged end of which is movably held between the upper end of a vertically displaceable valve presser spindle 29 and an annular member 30. Threaded externally onto the annular member 30 is the upper portion of a helical tension spring 31, the lower portion of which is in a similar manner threaded onto the fixed guide sleeve of the spindle 29. The lower end of the spindle forms a fork in which is mounted a roller 32 bearing against the cam disk 33 of the valve gear, said cam disk 33 rotating in known manner at half the number of revolutions of the motor. The cam disk is mounted between the one side wall of the crank casing 2 and a bearing plate 34 inserted into the crank casing, and is provided with a toothed rim 35 having internal teeth, said toothed rim meshing with a gear wheel 37 milled out of the crank shaft 36 of the motor, the number of teeth of the gear wheel 37 being half as great as the number of teeth of the toothed rim 35. The bearing of the cam disk 33 is formed by a support 38 projecting from the bearing plate 34, said support 38 partly surrounding the crank shaft and the gear wheel 37, as will appear from Figure 1, and having the inner faces of the teeth of the rim 35 slidably bearing thereagainst.

The drawing shows the positions of the movable parts on completion of the expansion stroke. At this moment the crank 25 is turned down toward the valve 9, the center line thereof and the center line of the link 23 coinciding with the axis of the coaxially arranged valves 8, 9. Both valves are thus depressed into the closing position. On account of the position of the crank the valve 5 is then entirely locked and may for this reason in the said position be regarded as a fixed part of the combustion chamber, against which the excess pressure in the working cylinder forces the piston valve 8, whereby, consequently, a good self-tightening effect is obtained between the valve 9 and the valve seat 14 formed on the inner side of the piston valve. The piston valve itself affords, as mentioned hereinbefore, a tight fit with the surrounding valve cylinder by means of the piston ring 13.

During the next exhaust stroke of the working piston, the valve presser 29, 32 is lowered during the rotation of the cam disk in the direction of the arrow 39, down to its lowermost position, the link rod 28 then turning the crank 27 downwards so as to swing out the crank 25 from the locked position shown with full drawn lines in Figure 1 to the left extreme position $25^1$ indicated by chain-dotted lines. By reason of this the central valve 9 slides upwards in its annular guide 16, the piston valve 8 being caused on account of the excess pressure in the working cylinder, to partake in the upward movement of the central valve so as to maintain the tight fit between the valve seat 14 and the central valve 9, the exhaust openings 12 being thus uncovered. The hot combustion gases sweep during the exhaust over the lower conically tapered edge 10 of the piston valve, said edge offering only a relatively small heat absorbing surface, while the said combustion gases are not brought into contact with the cylindrical outside of the piston valve to any appreciable extent, said cylindrical outside forming, on the contrary, a large convective surface.

Towards the end of the exhaust stroke the roller 32 again commences to move up onto the largest projecting portion of the cam disk, whereby the shaft 26 is turned in the opposite direction and the crank 25 is thus swung back toward the middle position shown in full lines, which position is reached immediately at the beginning of the subsequent suction stroke. At this moment the two valves are thus again closed. The The valve presser, however, is moved further upwards by the largest projecting portion 40 of the cam disk, with which portion the roller 32 is now brought into contact, and the crank 25 will thus swing over the middle position outwards towards the right extreme position 25″ indicated with chain-dotted lines in Figure 1. The central valve 9 is thus pulled up anew, but without being followed by the piston valve 8, which is separated from the valve 9 by reason of the vacuum in the working cylinder and remains resting in its normal position. The cold fuel gases now entering between the central valve 9 and the valve seat 14 do not sweep only along the outside of the valve 9, but sweep at the same time along the inside of the valve 8, thus also aiding to cool the latter.

Towards the end of the suction stroke the valve presser again begins to move down so as to turn the crank 25 back towards the locking middle position which is reached immediately at the beginning of the compressing stroke. This locking position of the valve gear is then maintained unaltered during the compression stroke and the subsequent expansion stroke, during which the roller 32 rests against a portion 41 of the cam disk, which portion is shaped on a circular arc and is concentrically disposed with respect to the bearing of the cam disk 33, the valve presser being thus neither raised nor lowered. During this the piston valve thus tightens in the manner above described, first, by reason of the excess pressure of the working cylinder against the central valve and, second, with the tightening means of the piston against the valve cylinder. At the end of the expansion stroke the starting positions shown in Figure 1 are reassumed.

In the arrangement above described, the valve gear for the central valve body also acts upon the piston valve, through the intermediary of said valve body, in such a manner that both valves are kept closed together during the compression and expansion strokes. In its open position, however, the central valve body has on such mediative action. The external valve may during this moment be kept closed solely on account of the weight of the piston valve or by the influence of the gas stream through the central valve opening. Under unfavourable conditions, particularly when the ignition is irregular, irregularities in the mode of operation of the piston valve may be caused by reason of the incomplete control over said piston valve, in such a manner, for example, that the piston valve on the outgoing movement of the central valve body at the beginning of the suction stroke is caused to stick to the latter, whereby the exhaust valve will thus be opened instead of the suction valve.

In the embodiment according to Figures 3 to 5, the piston valve is arranged to be actuated by the valve gear of the central valve, partly through the medium of the central valve body, and partly in a direct manner, when the intermediate action of the latter ceases, whereby the said inconvenience is obviated.

In Figures 3 to 5, such parts as correspond directly to parts already described are provided with corresponding reference characters. The tightening surfaces of the piston valve 8 and the fixed valve seat 42 are enlarged by steps upwards or outwards, being composed each of a number of cylindrical segments 43 and 44 respectively, which are separated by annular bosses 45 and 46 respectively. By this arrangement the advantage is gained that the external surrounding valve may be opened completely by a stroke of the piston valve which is comparatively very short in relation to the total axial length of the tightening surfaces. This is so for the reason that, while the total axial length of each tightening surface is equal to the sum of the heights, of the various cylindrical ring segments 43 and 44 respectively, the adjustment of the valve from an entirely closed to the open position is effected by a valve stroke which is about equal to the height of one of the said cylinder segments. At the lower edge of each of the cylinder segments 44 of the fixed valve seat there is provided a groove 47 serving to take up any oil that may get in between the tightening surfaces as well as a portion of the gas residues to be found between the bosses 45 and 46, so that too powerful a compression of the latter is prevented when the valve is closed. The piston valve is extended upwards and is provided at its upper end with an enlarged portion forming an abutment 48. Between the latter and a corresponding abutment on the inside of the valve cylinder 11 there is inserted a helical spring 49 tending to lift the piston valve from the fixed valve seat. Approximately at its middle portion the piston valve is provided with an internal threaded portion 50 receiving a threaded ring 51, which is divided by a deep circumferential cut into two annular flanges 51′, 51″ which are free at their edges and each provided with a number of passage openings 52 for the fuel gases. The flanges 51′, 51″ are somewhat resilient, and the one of said flanges is somewhat upset in such a manner that the threads thereof are somewhat dislocated in axial direction with respect to the threads of the other flange. When the ring 51 is screwed in, the threads of the flanges will thus exert great friction against the threads of the piston valve, whereby unintentional unscrewing is prevented. Inserted into the central opening of the ring 51 is a sleeve 53 resting on the ring with an abutment 54 and retained by a stop ring 55 or the like shrunk on the lower edge of the sleeve.

The central valve body 9 is provided with an upper cylindrical extension 56 fitting into the sleeve 53 which serves as a guide for the central valve.

The lower end of a link 58 is mounted on a transversal stud 57 in an interstice in the upper end of the cylindrical extension 56. The guide sleeve 53 is provided with corresponding axial cuts 59 to permit the link 58 extending partly down into the sleeve to swing about the stud 57. The upper end of the link is mounted on a stud 60 between the shanks of a bifurcated crank 61 which is mounted on a stud 62 inserted transversely through the upper portion of the cap 17 connected to the valve cylinder 11, the supply conduit for the fuel gases opening into said cap as at 20. The shanks of the crank 61 is provided with laterally projecting extensions 63, the lower edges of which form cam surfaces 64 arranged to cooperate each with one of two rollers 65 mounted on two studs 66 projecting at the upper portion of the guide sleeve 53. The cam surfaces 64 are shaped on circular arcs, the centres of which are situated on the center line of the stud 32, and their radius is so selected that small clearances 67 are provided between the cam surfaces and the roller in the position of the movable parts shown in the drawing.

Furthermore, the crank 61 is connected with the one end of a link rod 68 extending through an opening in the wall of the cap 17, the other end of said link 68 being pivotally connected with the upper end of a slide block 69 made in the form of a circular segment and having a rectangular cross section, said slide block 69 being movable in an arcuate path within a knee-shaped guide sleeve 70 connected to the said opening in the cap, said guide sleeve 70 surrounding the slide block with a tight fit. Connected to the lower end of the circular segment 69 is a valve presser 71 which is connected at the bottom to the one arm of a two-armed lever 72, the other arm of which carries a valve presser roller 32 bearing against the cam disk 33 under the influence of a helical spring 73 acting on the lever 72.

Figures 3 and 4 show the positions of the movable parts upon completion of the compression stroke. At this moment the crank is turned down towards the valves, and the center line of the crank as well as the center line of the link 58 will then coincide with the geometrical axis of the coaxially arranged valves 8, 9. Both valves are thus depressed in the closing position. By reason of the position of the crank, the valve 9 is now entirely locked and may therefore, in this position, as in the preceding case, be regarded as a fixed part of the combustion chamber against which the piston valve 8 is pressed on account of the excess pressure in the working cylinder. The piston valve itself tightens with its cylindrical tightening surfaces 43 against the corresponding tightening surfaces 44 of the fixed valve seat, as set forth hereinbefore. At the moment illustrated in Figures 3, 4 the roller 32 bears against the circular portion 41 of the circumference of the cam disk 33 during the rotation of the cam disk in the direction of the arrow 39.

During the subsequent expansion stroke of the working piston the roller 32 continues to run on the circular arc 41, whereby the valve presser 71 and thus also the crank 61 are maintained in unaltered positions, the valves being, consequently, kept in closed and locked positions.

During the exhaust stroke, the roller 32 is pressed by the spring 73 inwards toward the reduced portion of the circumference of the cam disk, the valve presser 71 being thus lifted and the slide block 69 also caused to move upwards, while the crank 61 is, consequently, swung outwards to the right in Fig. 3 through the displacement of the link rod 68. By reason of this the central valve body 9 is caused to slide upwards, the piston valve 8 being then entrained through the influence of the spring 49 and the excess pressure in the working cylinder, the rollers 65 mounted on the sleeve 53 going clear of the cam surfaces 64 of the crank when the latter is swung out and the tight fit between the piston valve 8 and the central valve body being maintained during this movement. By this the exhaust openings 12 are uncovered and the exhaust gases are permitted to escape.

Toward the end of the exhaust stroke the roller 32 begins to move up on the greatest projecting portion 40 of the cam disk 33, whereby the valve presser 71 is lowered and the crank is swung back to the middle position through the medium of the slide block 69 and the link rod 68, the said middle position being reached immediately at the beginning of the next suction stroke. At this moment the two valves are thus again closed. The valve presser, however, is moved further downwards under the influence of the portion 40 of the cam disk, and the crank 61 will thus swing over the middle position to the left. The central valve body is thus pulled up anew, but without being followed by the piston valve which is prevented from being entrained because of the cam surface 64 of the crank being now in the path of the rollers 65, sliding on the latter during the movement of the crank. The central valve will thus be opened, and the cold fuel gases enter the working cylinder, sweeping over the inside of the piston valve and cooling the latter. During the whole of the suction stroke the piston valve is retained in the closed position relatively to the fixed valve seat 42, thus keeping the exhaust openings closed.

Toward the end of the suction stroke the valve presser 71 is again subjected to a beginning lifting action, and the crank 61 is turned back toward the locking middle position. This locking position is maintained unaltered during the compression stroke, during which the roller 32 bears on the circular portion 41 of the circumference of the cam disk. At the end of the compression stroke all parts are in the positions shown in Figure 3.

As will be seen from the above, the cam surfaces 64 of the crank are active only during the suction stroke of the piston. In the locking position shown in the drawing, however, there are formed, as already set forth, clearances 67 between the cam surfaces 64 and the rollers 65, whereby the piston valve is permitted to bear with a tight fit on the central valve body under the influence of the excess pressure in the working cylinder.

As will be understood from the above, considerable advantages are gained through the invention. The inner wall of the combustion chamber can be reduced at a given volume and will be reduced to a minimum through the spherical shape of the combustion chamber, while large suction and exhaust openings for the gases are maintained at the same time. Through the spherical shape of the combustion chamber, the paths of combustion likewise will be reduced to a minimum. The arrangement of "pockets" for the mounting of the valves may be altogether dispensed with. The exhaust valve, which in the constructions as hitherto known is subjected to excessive heating through the combustion gases, may be formed, according to the invention, with small heat-absorbing surfaces and with large cooling surfaces, and is further cooled by the cold fuel gases sweeping over the inside thereof during the suction.

Claims:

1. A valve mechanism adapted particularly for internal combustion motors, characterized by an outwardly opening valve provided with a movable valve seat which is pressed by internal excess pressure against the valve body, when the latter is kept in the closed position by means of a suitable locking mechanism, said valve seat, in turn, making a tight fit with the surroundings.

2. A valve mechanism according to claim 1, characterized by the movable valve seat forming at the same time the valve body of an external valve surrounding the first-mentioned valve body annularly and coaxially.

3. A valve arrangement particularly for internal combustion motors and comprising in combination a valve cylinder, an axially movable valve seat in said cylinder, piston tightening means provided on the outside of said valve seat for closing lateral exhaust openings independently of small axial dislocations of the valve seat, an outwardly opening central valve body adapted to fit said valve seat, and means for locking the central valve body in operative position so as to cause efficient tightening pressure between the valve body and the valve seat to be established by the action of internal excess pressure on the latter.

4. A valve arrangement according to claim 3, characterized by the piston valve formed by the movable valve seat being arranged to be actuated exclusively in conjunction with the adjustment of the central valve, the arrangement being such that the piston valve follows the movement of the central valve when there is an excess pressure in the cylinder, but is separated from the central valve body when there is a vacuum in the cylinder.

5. A valve arrangement according to claim 3, characterized by the central valve being arranged to form a fixed part of the wall of the combustion chamber on account of the locking during the compression and expansion strokes, against which wall the annular slide valve is pressed with a tight fit by the inner excess pressure in the working cylinder.

6. A valve arrangement according to claim 3, characterized by the locking means being formed by the gear of the central valve, which includes a crank and a link rod connected between the crank pin and the valve, the arrangement being such that the radius of the crank and the center line of the link rod are caused to coincide with the geometrical axis of the coaxial valves during the compression and expansion strokes.

7. A valve arrangement according to claim 3, characterized by that the locking means are formed by a valve gear comprising a crank and a link rod connected between the crank pin and the central valve body, said crank being arranged to be swung outwards toward the one side from the locking position during the suction stroke, in order thus to open the central valve for the gas inlet, and to be swung in the opposite direction during the exhaust stroke, counted from the locking position, the piston valve then uncovering the exhaust openings while maintaining the tight fit with the central valve.

8. A valve arrangement, particularly for internal combustion motors and comprising in combination a valve cylinder, an axially movable valve sleeve in said cylinder controlling lateral valve openings, a valve seat formed in said valve sleeve, an outwardly opening central valve body adapted to fit said valve seat, means for actuating the valve sleeve through the medium of the central valve body and alternate means for actuating the valve sleeve independently of the central valve body, said alternate means being interconnected between the valve gear of the central valve body and the valve sleeve in such manner as to be brought into operation when the said mediative action of the central valve body ceases by the valve last mentioned being opened.

9. A valve mechanism according to claim 8, characterized by the fact that the valve gear includes one or more locking members arranged, in certain positions of the valve gear and independently of the central valve body, to lock the piston valve in the locking position, whereas said locking members are inoperative in the other positions of the valve gear.

10. A valve mechanism according to claim 8, characterized by the fact that the valve gear includes a crank connected with the central valve body through a link rod, said crank being provided with locking surfaces arranged to co-operate with corresponding locking surfaces on the piston valve, and to be moved, through the adjustment of the crank, into or out of locking position relatively to the latter.

11. A valve arrangement according to claim 8, characterized by that the valve gear of the central valve body includes locking members arranged to retain the piston sleeve independently of the central valve body and against the influence of a spring actuating the valve sleeve.

12. A valve arrangement particularly for internal combustion motors and comprising in combination a valve cylinder, an axially movable valve sleeve in said cylinder controlling lateral valve openings, a valve seat formed in said valve sleeve, an outwardly opening central valve body adapted to fit said valve sleeve, a valve gear for the central valve body, a guide sleeve provided with locking surfaces, means for actuating the valve sleeve through the medium of the central valve body and alternate means for actuating the valve sleeve independently of the central valve body, said alternate means consisting of locking members connected with the valve gear and adapted to co-operate with the locking surfaces formed on the guide sleeve.

In testimony whereof I affix my signature.

KARL GUSTAF ÖSTBERG.